US010742722B2

United States Patent
Vacaro et al.

(10) Patent No.: US 10,742,722 B2
(45) Date of Patent: Aug. 11, 2020

(54) SERVER LOAD BALANCING

(71) Applicant: Hewlett Packard Enterprise Development LP, Houston, TX (US)

(72) Inventors: Juliano Vacaro, Porto Alegre (BR); Sebastien Tandel, Santa Clara, CA (US); Bryan Stiekes, Brownstown Township, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 266 days.

(21) Appl. No.: 15/736,220

(22) PCT Filed: Jun. 26, 2015

(86) PCT No.: PCT/US2015/038048
§ 371 (c)(1),
(2) Date: Dec. 13, 2017

(87) PCT Pub. No.: WO2016/209275
PCT Pub. Date: Dec. 29, 2016

(65) Prior Publication Data
US 2018/0176294 A1  Jun. 21, 2018

(51) Int. Cl.
*G06F 15/16* (2006.01)
*H04L 29/08* (2006.01)
(Continued)

(52) U.S. Cl.
CPC .......... *H04L 67/1004* (2013.01); *H04L 45/38* (2013.01); *H04L 47/125* (2013.01); *H04L 67/1002* (2013.01)

(58) Field of Classification Search
CPC ... H04L 45/38; H04L 47/125; H04L 67/1002; H04L 67/1004
See application file for complete search history.

(56) References Cited

U.S. PATENT DOCUMENTS 6,601,084 B1 * 7/2003 Bhaskaran .............. G06F 9/505
709/223
2002/0163919 A1 * 11/2002 Hu .................... H04L 29/12132
370/400
(Continued)

FOREIGN PATENT DOCUMENTS

CN    103595648 A    2/2014
CN    103795805 A    5/2014
(Continued)

OTHER PUBLICATIONS

International Searching Authority, The International Search Report and the Written Opinion, dated Apr. 25, 2016, PCT/US2015/038048, 11 Pgs.
(Continued)

*Primary Examiner* — Normin Abedin
(74) *Attorney, Agent, or Firm* — Hewlett Packard Enterprise Patent Department

(57) ABSTRACT

Examples relate to load balancing servers. In one example, a computing device may: receive a network packet from a source device, the network packet including data specifying a value; divide the value included in the network packet by a divisor; determine, from a plurality of servers, a destination server for the network packet based on a remainder of the division; and forward the network packet to the destination server.

12 Claims, 4 Drawing Sheets

(51) Int. Cl.
*H04L 12/803* (2013.01)
*H04L 12/721* (2013.01)

(56) References Cited

U.S. PATENT DOCUMENTS

| | | | |
|---|---|---|---|
| 2006/0221973 | A1 | 10/2006 | Yamazaki et al. |
| 2008/0066073 | A1 | 3/2008 | Sen |
| 2010/0332664 | A1 | 12/2010 | Yevmenkin et al. |
| 2013/0268646 | A1 | 10/2013 | Doron et al. |
| 2013/0283374 | A1 | 10/2013 | Zisapel et al. |
| 2014/0304415 | A1* | 10/2014 | Prakash .................. H04L 47/70 709/226 |
| 2014/0325636 | A1 | 10/2014 | Mihelich et al. |
| 2014/0328179 | A1 | 11/2014 | Kabakura |
| 2016/0156708 | A1 | 6/2016 | Jalan et al. |

FOREIGN PATENT DOCUMENTS

| | | |
|---|---|---|
| CN | 104067578 A | 9/2014 |
| EP | 2284700 A1 | 2/2011 |

OTHER PUBLICATIONS

Junjie Zhang et al., "Load Balancing for Multiple Traffic Matrices Using SDN Hybrid Routing," 2014 IEEE International Conference on High Performance Switching and Routing (HPSR), Jul. 1-4, 2014, pp. 44-49, IEEE.

Yannan Hu et al., "BalanceFlow Controller Load Balancing for OpenFlow Networks," Proceedings of IEEE CCIS2012, Oct. 30-Nov. 1, 2012, pp. 780-785, IEEE.

Wang et al., "OpenFlow-based Server Load Balancer Gone Wild", Hot-ICE'11 Proceedings of the 11th USENIX conference on Hot topics in management of internet, cloud, and enterprise networks and services, 2011, 6 pages.

Curtis et al., "DevoFlow: Cost-Effective Flow Management for High Performance Enterprise Networks", Hotnets-IX Proceedings of the 9th ACM SIGCOMM Workshop on Hot Topics in Networks, 2010, 6 pages.

"Intel Open Networking Platform", available online at <https://01.org/intel%C2%AE-open-network-platform-intel-onp>, 9 pages.

* cited by examiner

SERVER LOAD BALANCING

BACKGROUND

Network communications between computing devices are often carried out by transmitting network packets from one device to another, e.g., using a packet-switched network. In some client-server network environments, multiple server computers may be used to handle communications to and from a variety of client devices. Network load balancing techniques may be used in a manner designed to ensure server computers do not get overloaded when processing network communications.

BRIEF DESCRIPTION OF THE DRAWINGS

The following detailed description references the drawings, wherein.

DETAILED DESCRIPTION

Figure 1:
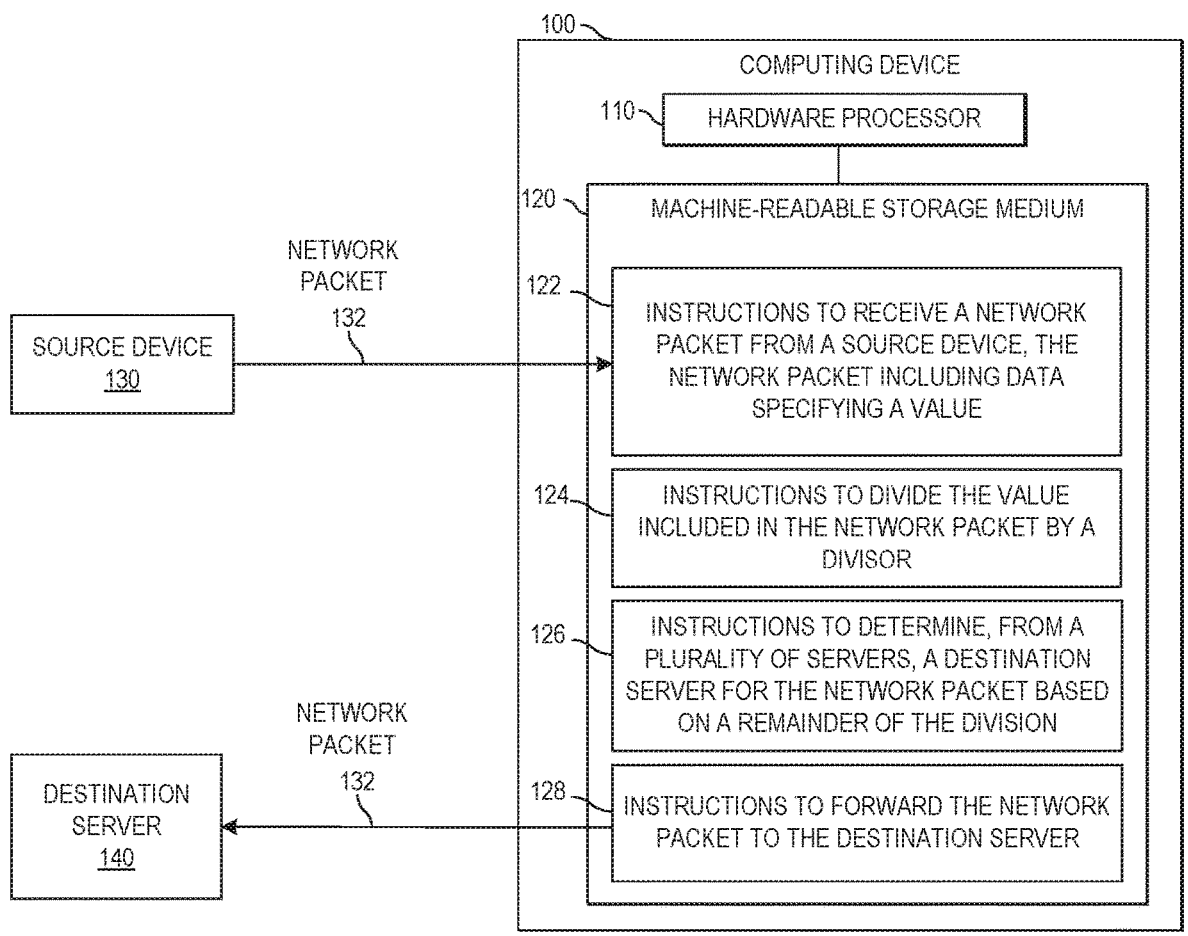
FIG. 1 is a block diagram of an example computing device for server load balancing.

In a packet-switched network, various devices, such as personal computers, mobile phones, and server computers, often send data to one another using network packets. Network packets are formatted units of data that include a variety of information, such as source and destination identifiers and payload data intended for a destination device. In some networking environments, such as a cloud computing environment that uses multiple server computers to provide services to multiple client devices in communication with the server computers, it is useful to distribute the incoming network traffic between server computers in a manner designed to ensure that servers do not get overloaded with network traffic.

Intermediary network devices, which are hardware devices used to route network traffic between network devices, e.g., routers, switches, programmable network cards, programmable network components, or other such devices, can be configured to perform operations that proactively and/or reactively load balance server computers. In certain types of networks, such as software defined networks (SDNs), a network controller manages intermediary network devices by providing the network devices with configuration data used to create rules for forwarding network traffic throughout the network. For example, a SDN network controller may provide switches within the SDN with rules that are used by the switches to forward network traffic to servers within the SDN. The rules may, for example, cause a switch to determine which server a particular network packet should be sent to by determining the modulus of a random or pseudo-random value associated with the particular network packet. Modulus, which provides the remainder of division, may be used for pseudo-random server selection for speed and efficiency. For example, a more complex random number generation algorithm or hashing function may be incapable of being performed by, or perform relatively poorly on, an SDN switch.

In operation, an intermediary network device may receive rules from a network controller, and the rules may identify servers to which network traffic is to be forwarded and buckets associated with those servers. When the intermediary device receives a new network packet, a value associated with the network packet—such as the source IP or source port—may be divided by the number of buckets associated with the servers. The division results in a remainder, e.g., the value of which may range from 0 to one less than the number of buckets, and the remainder may be used to select a bucket associated with one of the destination servers. The intermediary network device may then forward the network packet to the destination server associated with the selected bucket. In situations where the value associated with the network packet is random or pseudo-randomly generated, the remainder used to select a server will also be random or pseudo-random.

When a particular server is to be load balanced, the network controller may provide the intermediary network device with instructions for load balancing the particular server. The rules may cause the intermediary network device to forward, to a load balancing device, network traffic that would otherwise be forwarded to the particular server. The load balancing device determines whether each received network packet should be forwarded to the server in need of load balancing or forwarded to a different server. The determination may be made, for example, based on whether or not the network packets are new packets or part of an existing network flow being processed by the particular server, e.g., determined based on a TCP_SYN flag or other metadata included in each network packet. After making the determination, the load balancing device may modify the destination of the received network packet and provide the modified network packet to the intermediary network device, which forwards the modified network packet to its intended destination.

When server load balancing is managed in a manner similar to that described above, intermediary network devices may facilitate relatively efficient distribution of network traffic between server devices. Communications between the SDN switches and an SDN controller, for example, may be relatively light. In addition, load balancing servers in the manner described above may be performed on hardware devices that have less available hardware resources than a software-implemented load balancer operating on a server computer. The potential for increased load balancing speed and reduced network latency introduced by the manner of load balancing described above may be beneficial to both users and administrators of a network implementing the technology. Further details regarding load balancing of network packets, and the transition of network packet flows from one server to another, are discussed in further detail in the paragraphs that follow.

FIG. 1 is a block diagram of an example computing device 100 for server load balancing. Computing device 100 may be, for example, an intermediary network device, such as a programmable network switch, router, or any other electronic device suitable for use as an intermediary device in a packet-switched network, including a software defined network (SDN) programmable network element. In the embodiment of FIG. 1, computing device 100 includes a hardware processor, 110, and machine-readable storage medium, 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-128, to control the process for server load balancing. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for replicating network communications received by the computing device 100.

As shown in FIG. 1, the computing device 100 receives a network packet 132 from a source device 130, and the network packet 132 includes data specifying a value (122). The network packet 132 may be, for example, an internet protocol (IP) packet comprising a header portion and a payload portion. The value may be any number of values associated with the network packet 132, such as the source port, at least a portion of the source and/or destination IP address, and/or a numerical representation of characters included in the network packet 132. The source device 130 is an end-point device, such as a personal computer, mobile phone, server computer, or other computing device from which the network packet 132 originates. The network packet 132 need not be sent directly to the computing device 100, but may instead be routed through various intermediary network devices and, in some implementations, other end-point devices.

The computing device 100 divides the value included in the network packet by a divisor (124). The divisor is a non-zero number that may be provided by the network controller and/or based on a variety of things, such as the number of servers to which the computing device 100 may forward the network packet 132. In some implementations, each server to which the computing device 100 may forward the network packet 132 may correspond to one or more buckets, and the divisor may be based on the number of buckets. For example, in a situation with five servers, two buckets may be associated with each server, making a total of 10 buckets. A divisor based on the number of buckets may be, for example, the number of buckets, e.g., 10, or a number evenly divisible by the number of buckets, e.g., 5, 10, 15, etc. In a situation where the value is the last set of digits in a source IP address of the network packet 132, e.g., the value 105, the computing device 100 may divide 105 by 10.

In some implementations, the division of the value and/or the number of servers and/or buckets is based on one or more rules provided by a network controller. For example, in situations where the computing device 100 is a software-defined switch operating in a SDN, an SDN controller may generate rules for how network traffic should be forwarded by the switch and send the rules to the switch, e.g., for storage in the storage medium 120 or a separate machine-readable storage medium. Using the example above, a set of rules provided to the computing device 100 may be:

If (Source IP Address) % (number of buckets)==0; fwd port 1.
If (Source IP Address) % (number of buckets)==1; fwd port 2.
If (Source IP Address) % (number of buckets)==2; fwd port 3.
If (Source IP Address) % (number of buckets)==3; fwd port 4.
If (Source IP Address) % (number of buckets)==4; fwd port 5.
If (Source IP Address) % (number of buckets)==5; fwd port 1.
If (Source IP Address) % (number of buckets)==6; fwd port 2.
If (Source IP Address) % (number of buckets)==7; fwd port 3.
If (Source IP Address) % (number of buckets)==8; fwd port 4.
If (Source IP Address) % (number of buckets)==9; fwd port 5.

For each of the above example rules, performing the modulus operation, e.g., represented by the "%" symbol, obtains a remainder by first dividing the Source IP Address by the number of buckets. As described below, the result of the division may be used to load balance network packets.

The computing device 100 determines, from a group of servers, a destination server 140 for the network packet 132 based on the remainder of the division (126). Using the example values provided above, the remainder of 105 divided by 10 is 5. The remainder, 5, may be used to select a bucket, and the server that corresponds to the selected bucket may be chosen as the destination server 140 for the network packet 132. In the example implementation above, where rules are provided by the network controller, the condition specified by the sixth rule is met. For example, 105% 10==5. Accordingly, in this situation, the rule specifies that the computing device 100 should forward the network packet 132 to the destination server associated with port 1. In the foregoing example, the use of 5 different ports may indicate that there are 5 different servers to which network packets may be forwarded, e.g., each server corresponding to one of the 5 ports. In situations where the Source IP Address value is random, the distribution of network packets between servers will also be random.

The computing device 100 forwards the network packet 132 to the destination server 140 (128). In the foregoing example, the computing device 100 would forward the network packet 132 to the destination server 140 through port 1. The manner in which the computing device 100 forwards the network packet 132 may vary. For example, the network packet 132 may be encapsulated and the encapsulated packet may be forwarded to the destination server. In some implementations, the destination address of the network packet 132 is changed to the address of the destination server 140.

In some implementations, the computing device 100 generates a rule specifying that additional network packets included in the same flow as the network packet 132 are to be forwarded to the same destination server 140. Network packets may be considered part of the same flow, for example, in situations where—within a predetermined period of time—the network packets have the same source address/port and the same destination address/port. The rule generated to match the network flow, because it is more specific than the general rule(s) that would cause random or pseudo-random distribution, is designed to ensure that all network packets of the same network flow are processed by the same destination device. Using the foregoing example values, an example rule may be:

If ((source IP==105) & (destination IP==[IP of destination server 140])); fwd port 5.

In this situation, additional network packets received by the computing device 100 that specify the same source IP as the source device 130 and the destination IP address of the destination server 140 will be forwarded to the destination server 140 through port 5, without the need to check against the other rules. Rules may have additional features or characteristics not provided in the above examples. For example, rules may have expiration timers, after which they are deleted, removed, or ignored. Expiration may be used to prevent unnecessary forwarding of unrelated network packets to a particular device. Another example rule feature or characteristic may be a rule priority that indicates which rule(s) take precedent over other rules. For example, the more specific forwarding rule to keep network packets of the same flow together may have a higher priority than the rules for distributing network packets using the modulus calculation.

While FIG. 1 depicts the intermediary computing device 100 as the only intermediary network device between the source device 130 and destination server 140, there may be any number of other intermediary network devices between the source device 130 and the computing device 100 and/or between the computing device 100 and the destination server 140 and other destination server(s). For example, a computing device 100 may logically reside at the edge of a private network, receive network packets from a switch or router operating in a public network, such as the Internet, and forward packets, as instructed, to various destination servers within the private network through one or more private network switches/routers.

In some implementations, network traffic to the destination device 140, or to another destination server, may be imbalanced. For example, if the random or pseudo-random distribution of network packets is skewed, one server may become overloaded. In these situations, the computing device 100 may execute instructions designed to load balance the overloaded server or servers, e.g., by transitioning network traffic from each overloaded server to another available destination server. The process for transitioning network traffic from one server to another is described in further detail below, e.g., with respect to FIGS. 2A and 2B.

Figure 2A:
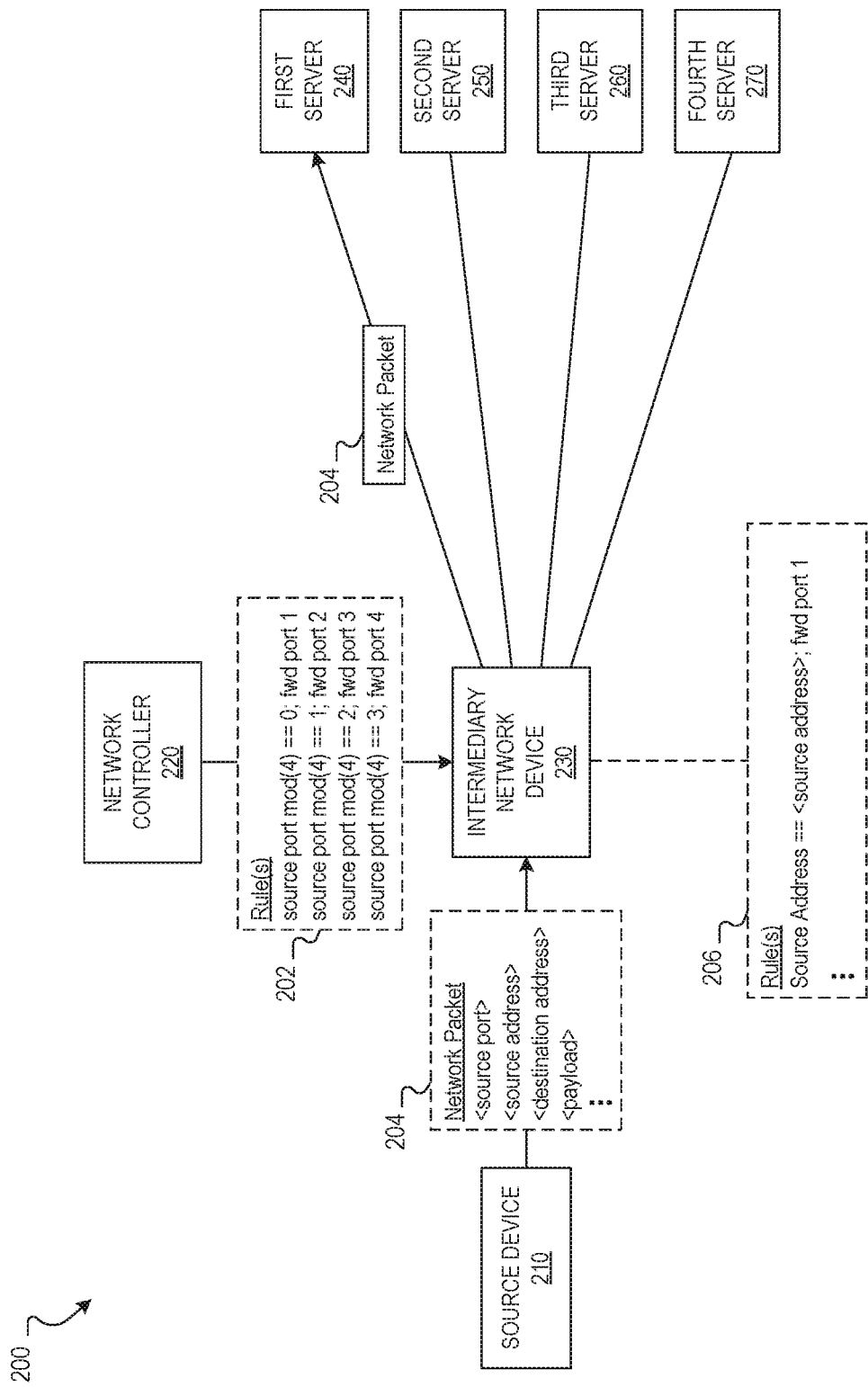
FIG. 2A is an example data flow for server load balancing.
Figure 2B:
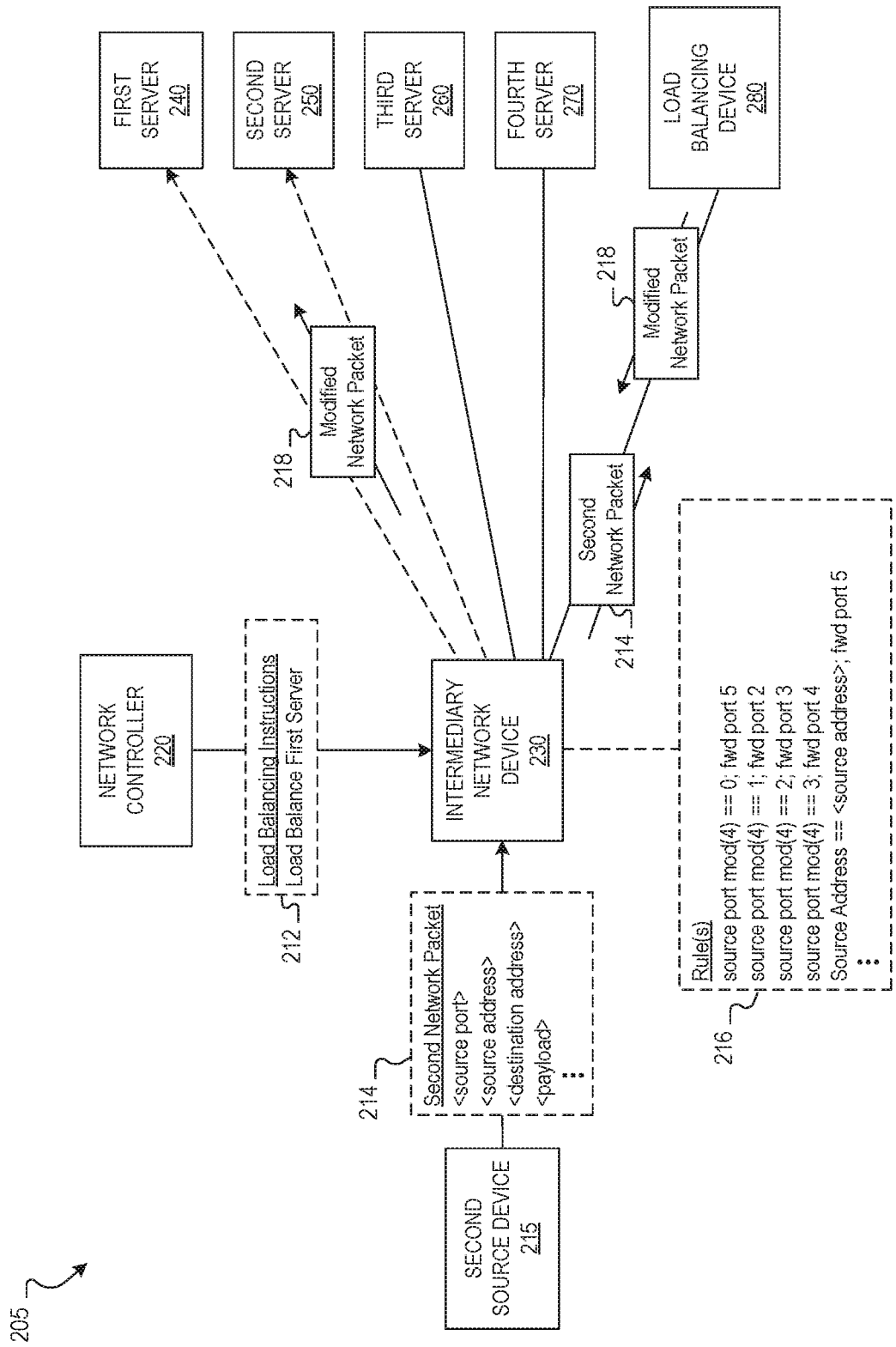
FIG. 2B is an example data flow for load balancing a server.

FIG. 2A is an example data flow 200 for server load balancing. FIG. 2B is an example data flow 205 for load balancing a server. In the example data flow 200, an intermediary network device 230 is in communication with a source device 210 and a network controller 220. The network controller 220 provides at least one rule 202 identifying servers as recipients of network packets, each of the servers being associated with a bucket. For example, the rules 202 provided to the intermediary network device 230 specify four different servers to which network traffic may be forwarded via various ports of the intermediary network device, and each of the four servers is associated with a bucket, e.g., a value representing the possible remainder of division by the number of buckets. The example rules 202 specify that the remainder of dividing a network packet's source port by the number of buckets, e.g., 4, will be used to determine which port the network packet will be forwarded through.

The source device 210, which may be, for example, a device like the source device 130 of FIG. 1. provides a network packet 204 to the intermediary network device 230. The network packet 204 includes a variety of information, including a source port, source address, destination address, and a payload. The information includes a value, such as a non-zero numerical value, or data that may be converted into a divisible value. In some implementations, particular portions of the information included in the network packet 204 are non-zero numerical values. In some implementations, non-numerical values may be converted into numerical values in a variety of ways, e.g., characters may be converted into their corresponding hexadecimal values, or alphabetical characters may be converted to numerical digits.

The intermediary network device 230, upon receipt of the network packet 204, divides the value included in the network packet 204 by a total number of buckets associated with the servers. For example, in the data flow 200, there may be 4 buckets, one for each destination server. In some implementations, the number of buckets may be a multiple of the number of destination servers. For example, using a multiple of the number of destination servers may ensure that each server corresponds to the same number of buckets as each other server.

The intermediary network device 230 determines a destination server for the network packet 204 based on the rules 202 and the remainder of the division. In the example data flow 200, the example rules 202 indicate which destination server will be used for each possible remainder of the division. When dividing by the number of buckets, e.g., 4 in this situation, the remainder will always be a value between 0 and one less than the number of buckets—0, 1, 2, or 3, in the example data flow 200.

As indicated in the example rules 202, when the remainder of the division is 0, the intermediary network device 230 forwards the network packet 204 through a numbered port, e.g., port 1, which, in this example, corresponds to the first server 240. When the remainder of the division is 1, network packets are forwarded through port 2, which corresponds to the second server 250. When the remainder of the division is 2, network packets are forwarded through port 3, which corresponds to the third server 260. When the remainder of the division is 3, network packets are forwarded through port 4, which corresponds to the fourth server 270.

In some implementations, the value was generated in a manner that results in a substantially even distribution of the remainder of division. Each source port, for example, may be sequentially selected by various computing devices, such as the source device 210. Given many sequentially selected numbers, the remainders of the division of the sequentially selected numbers may have a substantially even distribution. E.g., dividing each number between 1 and 100 by four would result in 25 occurrences of 0 as a remainder, 25 occurrences of 1 as a remainder, 25 occurrences of 2 as a remainder, and 25 occurrences of 3 as a remainder. In the examiner data flow 200, this would result in an even distribution of network flows between each destination server.

After determining which destination server the network packet 204 is to be forwarded to, the intermediary network device 230 forwards the network packet 204 to the destination server, e.g., the first server 240 in the example data flow 200. While the example rules 202 identify a port through which the intermediary network device 230 will forward network packets, other methods may also be used, e.g., forwarding to a particular address or to a different network device for forwarding to the destination server. In some implementations, the destination address of the network packet 204 may be updated to the address of the destination server, and/or the network packet 204 may be encapsulated for forwarding to its destination server. Other methods for forwarding network traffic to the various destination servers may be used to provide the network packet 204 to the intended destination.

In some implementations, the intermediary network device 230 may generate an additional rule or rules designed to ensure that network packets included in the same network flow are forwarded to the same destination server. In the example data flow 200, the intermediary network device 230 generates an additional rule 206 that specifies that additional network packets arriving with the same source address as the network packet 204 are to be forwarded through port 1, e.g., to the first server 240. The rule 206 may also be associated with a duration, after which the rule will timeout, and no longer be applied. The additional rules 206 may have a higher priority than the general rules 202 provided by the network controller 202, which enables network packets to be forwarded to the appropriate destination server without identifying the modulus of a value included in the network packets that match the condition specified by the rule 206.

As noted above, FIG. 2B depicts an example data flow 205 for load balancing a server. In some implementations, the network controller 220 may determine that one or more of the destination servers is unbalanced, e.g., based on monitoring the server's network traffic and system resources. In situations where the network controller 220 determines that a particular server is in need of load balancing, it may send the intermediary network device 230 instructions to load balance the particular server.

In some implementations, the intermediary network device 230 may determine when a particular server is unbalanced. The determination may be made in a variety of ways. For example, the intermediary network device may use counters to determine when a destination server has received a threshold number of network packets or flows. The threshold may be a predetermined value, or may be based network traffic handled by other destination servers, e.g., a threshold may be used to determine that a particular destination server is unbalanced when it has received 75% more network packets than any other destination server, or 50% more network packets than the number of network packets received by the destination server with the second highest network traffic. Other methods may also be used by the intermediary network device 230 to determine whether a particular server is imbalanced. For example, aggregate size of the network packets may be tracked to determine when a server is imbalanced. As another example, in situations where temporary rules are generated for handling network traffic belonging to the same network flow, the number of rules active for destination servers may be tracked to determine when a server is imbalanced.

In the example data flow 205, the intermediary network device 230 receives the load balancing instructions 212 from the network controller 220. The instructions 212 specify that the first server 240 is to be load balanced. The manner in which servers are load balanced may vary, and in the example data flow 205, the intermediary network device 230 changes any rules that specify network packets are to be sent to the first server 240 so that the rules now specify that the network packets are to be forwarded to a load balancing device 280. In the example data flow 205, some of the rules 216, e.g., those previously specifying port 1 as the destination port, have been updated to specify port 5 as the port through which network packets will be forwarded.

The intermediary network device 230 receives a second network packet 214 from a second source device 215. The second network packet may include the same source address as the first network packet 204, e.g., in situations where the second source device 215 is the same device as the first source device 210. In this situation, the source address would meet the condition specified by the rule, "Source Address==<source address>; fwd port 5," and the second network packet 214 would be forwarded to the load balancing device 280 through port 5. In situations where the second source device 215 is different from the first source device 210, and where the modulus of the source port is 0, the rules 216 also specify that the second network packet 214 be forwarded to the load balancing device 280.

The load balancing device 280 may be any computing device capable of network communications and data processing, and may include virtual computing devices, such as a virtual switch, e.g., implemented by a server computer in communication with the intermediary network device. In particular, the load balancing device 280 determines whether the second network packet 214 is to be forwarded to the imbalanced server, e.g., the first server 240, or if the second network packet 214 should instead be forwarded to a different destination server, e.g., one of the existing destination servers or a new destination server.

In some implementations, the load balancing device 280 may determine that network packets of new network flows should be forwarded to a new destination server, while network packets of network flows currently being processed by the imbalanced server should continue to be sent to the imbalanced server. This may be determined, for example, by examining the TCP_SYN flag or other metadata of a network packet, which may indicate whether the network packet is requesting a new connection. After making the determination, the load balancing device 280 may modify the second network packet 214, and send the modified network packet 218 back to the intermediary network device 230. The modified network packet 218 specifies which destination device is to be the recipient of the modified network packet 218, and the intermediary network device 230 forwards the modified network packet 218 to the intended recipient.

By way of example, in situations where the second source device 215 is the same as the first source device 210, the source address of the second network packet 214 is the same as that of the first network packet 204. In this situation, the second network packet 214 meets the conditions specified by the rule, "Source Address==<source address>; fwd port 5," and the intermediary network device 230 forwards the second network packet 214 to the load balancing device 280. The load balancing device 280 determines, based on session metadata included in the second network packet 214, that the second network packet 214 belongs to the same network flow as the first network packet 204 and should be handled by the same server, e.g., the first server 240. The load balancing device 280 modifies the second network packet 214, or generates a new modified network packet 218, which may include data included in the first network packet 204 and specifies the first server 240 as the destination, and provides the modified network packet 218 to the intermediary network device 230. The intermediary network device 230 then forwards the modified network packet 218 to the first server 240.

As another example, in situations where the second source device 215 is different from the first source device 210, the source address of the second network packet 214 may be different from that of the first network packet 204. In this situation, the general rules 216 may be applied to the second network packet 214 to determine its destination. If, in the example data flow 205, the modulus of the second network packet's source port is 1, 2, or 3, the intermediary network device 230 will forward the second network packet to, respectively, the second 250, third 260, or fourth server 270. If the modulus of the second network packet's source port is 0, the updated rule causes the intermediary network device 230 to forward the second network packet 214 to the load balancing device 280.

The load balancing device 280 determines, based on the TCP_SYN flag of the second network packet 214, that the second network packet 214 is the beginning of a new network flow and should be handled by a server other than the imbalanced server. The load balancing device 280 chooses a destination server for the second network packet 214, such as the second server 250, modifies the second network packet 214, or generates a new modified network packet 218, which specifies the chosen destination server and provides the modified network packet 218 to the intermediary network device 230. The intermediary network device 230 then forwards the modified network packet 218 to the chosen destination server which, in the example data flow 205, is the second server 250. In some implementations, the intermediary network device 230 may also generate a new rule based on the modified network packet, e.g., a rule causing subsequent network traffic belonging to the same network flow to be forwarded to the second server 250. This allows subsequent network packets of the same flow to be forwarded directly to the second server 250, rather than being provided to the load balancing device 280.

The load balancing device 280 may determine which destination server is to receive network packets from new network flows in a variety of ways. In some implementations, the load balancing device 280 may be in communication with the network controller 220 and distribute new network flows in the manner in which the network controller specifies. In some implementations, the load balancing device may randomly, or pseudo-randomly, cause network packets to be sent to existing destination servers and/or new destination servers. In another implementation, the load balancing device 280 implement logic designed to choose particular destination servers based on their current load, e.g., as monitored by the load balancing device 280 or another device in communication with the load balancing device 280.

Figure 3:
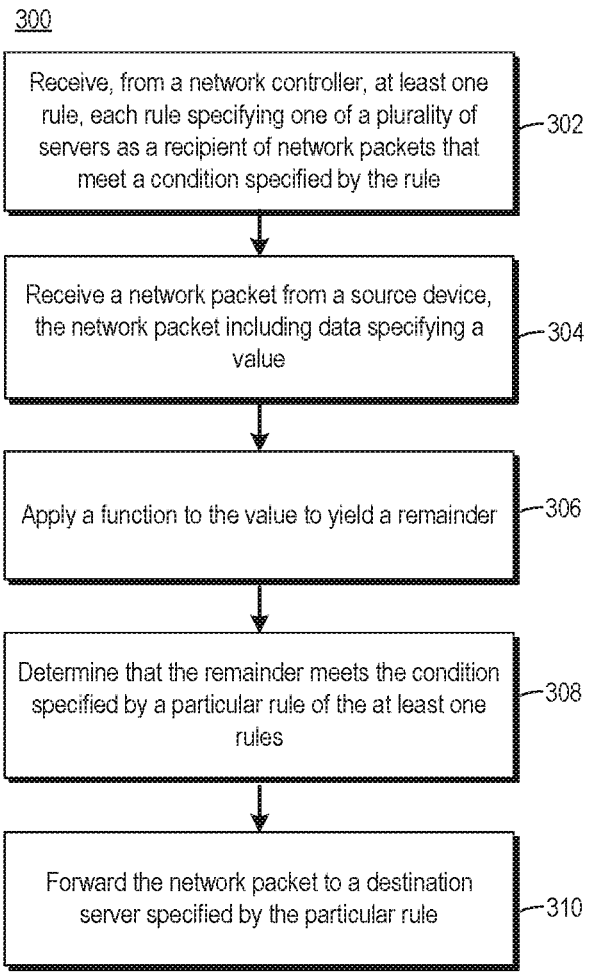
FIG. 3 is a flowchart of an example method for server load balancing.

FIG. 3 is a flowchart 300 of an example method for server load balancing. The method 300 may be performed by an intermediary network device, such as a computing device described in FIG. 1 and/or intermediary network device described in FIGS. 2A and 2B. Other computing devices may also be used to execute method 300. Method 300 may be implemented in the form of executable instructions stored on a machine-readable storage medium, such as the storage medium 120 and/or in the form of electronic circuitry.

At least one rule is received from a network controller, each rule specifying one of a plurality of servers as a recipient of network packets that meet a condition specified by the rule (302). For example, a condition specified by each rule may be that the modulus of the source address of a network packet matches a particular value. If the modulus of the source address of a particular packet matches the particular value for a particular rule, the recipient of the network packet may be the recipient specified by that particular rule.

A network packet is received from a source device, the network packet including data specifying a value (304). Network packets may include many different types of values, numerical or otherwise. For the purpose of using a value for load balancing, a randomly generated value, or pseudo-randomly generated value, may be the specified value, e.g., source port or source address.

A function is applied to the value to yield a remainder (306). For example, the modulus function may be applied to the value to obtain the remainder. The modulus function is applied with a particular divisor and results in the remainder of division of the value by the divisor. The divisor used for the modulus function may, in some implementations, depend up on a number of buckets associated with the rules and potential destination servers. Each bucket may represent the rules and/or values that result in network packets being forwarded to a particular server. For example, one bucket may be associated with modulus results of 1 and 5, e.g., with rules that cause network packets having values that result in a modulus of 1 or 5 being provided to a particular destination server.

The computing device determines that the remainder meets the condition specified by a particular rule of the rules (308). For example, modulus (5) applied to the received network packet's source port may result in a remainder between 0 and 4. One of the rules specifies a condition that is met by the remainder.

The network packet is forwarded to a destination server specified by the particular rule (310). For example, the particular rule having a condition met by the result of the modulus function is associated with a particular destination server. That particular destination server is chosen as the recipient for the network packet.

In some implementations, a first rule is generated for the source device, the first rule specifying: additional network packets included in the same flow as the network packet are to be forwarded to the destination server; and a period of time after which the first rule will timeout. The first rule is designed to ensure that network packets included in the same flow are handled by the same destination server, and the timeout is designed to ensure that future network flows are capable of being provided to different servers.

In some implementations, instructions to load balance the destination server are received from a network controller. For example, when the method 300 is implemented in a SDN switch, the switch may receive instructions to change the forwarding rules that identify the destination server as the recipient to specify a load balancing device, such as a virtual switch, as the recipient instead.

In situations where load balancing is being implemented, e.g., where traffic is transitioning from an imbalanced server to one or more other servers, the load balancing device may determine to which server incoming network packets will be sent. In some implementations of method 300, a second network packet may be received from a second source device. A determination may be made that the second network packet meets a condition specified by one of the changed rules, e.g., that the source address of the second network packet matches a source address specified by one of the changed rules. In response to the determination, the second network packet may be forwarded to the load balancing device. A modified network packet may then be received from the load balancing device, the modified network packet specifying the destination server as the recipient of the modified network packet, and the modified network packet being based on the second network packet. The modified network packet may then be forwarded to its intended recipient, e.g., the destination server. The foregoing may take place, for example, when the load balancing device determines that the second network packet belongs to a network flow that is already being handled by the destination device.

In some implementations of method 300, a second network packet including second data specifying a second value is received from a second source device. A function may be applied to the second value to yield a second remainder, and it may be determined that the second remainder meets a condition specified by one of the changed rules. For example, the remainder may match a value specified by one of the changed rules. In response to the determination, the second network packet may be forwarded to the load balancing device. A modified network packet may be received from the load balancing device, the modified network packet specifying, as the recipient of the modified network packet, a target server that is different from the destination server, and the modified network packet being based on the second network packet. The modified network packet may then be forwarded to its intended recipient, e.g., the target server.

The foregoing disclosure describes a number of example implementations for load balancing servers. As detailed above, examples provide a mechanism for load balancing network traffic at an intermediary network device and causing the packets to be distributed to separate destination servers. Other examples provide a mechanism for using an intermediary network device to transition network traffic from an imbalanced server to one or more other servers.

We claim:

1. An intermediary network device for server load balancing, the intermediary network device comprising:
   a hardware processor; and
   a data storage device storing instructions that, when executed by the hardware processor, causes the hardware processor to:
      receive a network packet from a source device, the network packet including data specifying a value;
      divide the value included in the network packet by a divisor;
      determine, from a plurality of servers, a destination server for the network packet based on a remainder of the division;
      forward the network packet to the destination server;
      generate a first rule for the source device, the first rule specifying:
         additional network packets included in a same flow as the received network packet that are to be forwarded to the destination server; and
         a period of time after which the first rule will timeout.

2. The network device of claim 1, wherein:
   each of a plurality of buckets corresponds to only one of the plurality of servers;
   each of the plurality of servers corresponds to at least one of the plurality of buckets; and
   the divisor is based on a number of buckets included in the plurality of buckets.

3. The intermediary network device of claim 1, wherein the instructions further cause the hardware processor to: receive, from a network controller, instructions to load balance the destination server; receive, from a second source device, a second network packet including second data specifying a second value; determine that the second network packet is destined for the destination server; and in response to determining that the second network packet is destined for the destination server, forward the second network packet to a load balancing device; receive, from the load balancing device, a modified network packet that specifies, as a recipient of the modified network packet, i) the destination server, or ii) a target server that is different from the destination server, the modified network packet being based on the second network packet; and forward the modified network packet to the recipient.

4. The intermediary network device of claim 3, wherein:
   the determination that the second network packet is to be forwarded to the destination server is based on:
      division of the second value by the divisor; or
      a rule specifying that network packets received from the second source device are to be forwarded to the destination server; and
   the load balancing device determines the recipient of the modified network packet by determining whether the second network packet is part of an existing flow or a first packet of a new flow.

5. A non-transitory machine-readable storage medium encoded with instructions executable by a hardware processor of an intermediary network device for server load balancing, the machine-readable storage medium comprising instructions to cause the hardware processor to:
   receive, from a network controller, at least one rule identifying a plurality of servers as recipients of network packets, each of the plurality of servers being associated with at least one bucket;
   receive a network packet from a source device, the network packet including source data specifying a value;
   divide the value included in the network packet by a total number of buckets associated with the plurality of servers;
   determine, from the plurality of servers, a destination server for the network packet based on i) the at least one rule, and ii) a remainder of the division;
   forward the network packet to the destination server;
   generate a first rule for the source device, the first rule specifying:
      additional network packets included in a same flow as the network packet that are to be forwarded to the destination server; and
      a period of time after which the first rule will timeout.

6. The storage medium of claim 5, wherein the instructions further cause the hardware processor to:
   receive, from the network controller, instructions to load balance the destination server; and
   for each rule that specifies network packets are to be forwarded to the destination server, including the first rule, changing the rule to forward network packets to a load balancing device.

7. The storage medium of claim 6, wherein the instructions further cause the hardware processor to:
   receive, from a second source device, a second network packet;
   determine that the second network packet meets conditions specified by one of the changed rules;
   in response to determining that the second network packet meets conditions specified by one of the changed rules, forward the second network packet to the load balancing device;
   receive, from the load balancing device, a modified network packet that specifies the destination server as a recipient of the modified network packet, the modified network packet being based on the second network packet; and
   forward the modified network packet to the recipient.

8. The storage medium of claim 6, wherein the instructions further cause the hardware processor to:
   receive, from a second source device, a second network packet including second data specifying a second value;

divide the second value included in the network packet by the total number of buckets associated with the plurality of servers;

determine, based on a second remainder of the division of the second value, that the second network packet matches one of the at least one buckets associated with the destination server;

in response to determining that the second network packet matches one of the at least one buckets associated with the destination server, forward the second network packet to the load balancing device;

receive, from the load balancing device, a modified network packet that specifies, as a recipient of the modified network packet, a target server that is different from the destination server, the modified network packet being based on the second network packet; and forward the modified network packet to the recipient.

9. A method for server load balancing, implemented by a hardware processor, the method comprising:

receiving, from a network controller, at least one rule, each rule specifying one of a plurality of servers as a recipient of network packets that meet a condition specified by the rule;

receiving a network packet from a source device, the network packet including data specifying a value;

applying a function to the value to yield a remainder;

determining that the remainder meets the condition specified by a particular rule of the at least one rules;

forwarding the network packet to a destination server specified by the particular rule;

generating a first rule for the source device, the first rule specifying:

additional network packets included in a same flow as the network packet are to be forwarded to the destination server; and a period of time after which the first rule will timeout.

10. The method of claim 9, further comprising:

receiving, from the network controller, instructions to load balance the destination server; and for each rule specifying the destination server as the recipient, including the first rule, changing the rule to specify a load balancing device as the recipient.

11. The method of claim 10, further comprising:

receiving, from a second source device, a second network packet;

determining that the second network packet meets a condition specified by one of the changed rules;

in response to determining that the second network packet meets a condition specified by one of the changed rules, forwarding the second network packet to the load balancing device;

receiving, from the load balancing device, a modified network packet that specifies the destination server as a recipient of the modified network packet, the modified network packet being based on the second network packet; and forwarding the modified network packet to the recipient.

12. The method of claim 11, further comprising:

receiving, from a second source device, a second network packet including second data specifying a second value;

applying the function to the second value to yield a second remainder;

determining that the second remainder meets a condition specified by one of the changed rules;

in response to determining that the second remainder meets the condition specified by one of the changed rules, forwarding the second network packet to the load balancing device;

receiving, from the load balancing device, a modified network packet that specifies, as a recipient of the modified network packet, a target server that is different from the destination server, the modified network packet being based on the second network packet; and forwarding the modified network packet to the recipient.

* * * * *